(12) United States Patent
Lavi et al.

(10) Patent No.: US 6,936,796 B2
(45) Date of Patent: Aug. 30, 2005

(54) AUTOMATIC TOASTER APPARATUS

(75) Inventors: Josef Lavi, Fort Lee, NJ (US); Eli Cohen, Moshav Tzur Moshe (IL)

(73) Assignee: AAC Trade Ltd., Fort Lee, NJ (US)

( * ) Notice: Subject to any disclaimer, the term of this patent is extended or adjusted under 35 U.S.C. 154(b) by 344 days.

(21) Appl. No.: 10/397,418

(22) Filed: Mar. 27, 2003

(65) Prior Publication Data

US 2004/0188410 A1 Sep. 30, 2004

(51) Int. Cl.⁷ .............................................. A21B 1/00
(52) U.S. Cl. ........................ 219/404; 219/385; 219/388
(58) Field of Search ................................. 219/385, 386, 219/388, 393, 395, 403, 404, 411, 412; 99/386, 387, 390

(56) References Cited

U.S. PATENT DOCUMENTS

| | | | | |
|---|---|---|---|---|
| 1,530,387 A | * | 3/1925 | Marra | 99/387 |
| 1,678,337 A | * | 7/1928 | Halifax | 99/387 |
| 2,151,401 A | * | 3/1939 | Belcher | 99/334 |
| 2,253,027 A | * | 8/1941 | Hall | 99/387 |
| 2,714,348 A | * | 8/1955 | Fokakis | 99/387 |
| 2,850,961 A | * | 9/1958 | Werner | 99/387 |
| 3,487,770 A | * | 1/1970 | Svensson | 99/334 |
| 3,665,842 A | * | 5/1972 | Visitacion | 99/332 |
| 3,712,480 A | * | 1/1973 | Houssa | 414/783 |
| 4,044,660 A | * | 8/1977 | Montague et al. | 99/326 |
| 6,058,829 A | * | 5/2000 | Endres | 99/357 |
| 6,561,081 B2 | * | 5/2003 | Xu | 99/326 |

* cited by examiner

Primary Examiner—Joseph Pelham
(74) Attorney, Agent, or Firm—G.E. Ehrlich (1995) Ltd.

(57) ABSTRACT

Automatic toaster apparatus as described including a displacing mechanism for displacing at least one of the heater plates, preferably both heater plates, towards and away from the food article in the toaster in order to accelerate the toasting thereof. According to another feature, particularly useful in apparatus for toasting bagels or other types of rolls having relatively hard crust layers on their outer surfaces, the toaster includes cutter blades for cutting through the roll before the roll is fed into the toasting unit. In the described embodiment, the cutter includes a pair of spaced cutter blades for cutting away the crust layer on the opposite faces of the roll before the roll is fed into the toaster unit.

18 Claims, 5 Drawing Sheets

AUTOMATIC TOASTER APPARATUS

FIELD AND BACKGROUND OF THE INVENTION

The present invention relates to toasting apparatus for toasting various types of food articles. One embodiment of the invention described below is particularly useful for toasting bread slices, and another embodiment described below is particularly useful for toasting bagels or other types of rolls having outer crusts.

A large number of toaster devices have been developed and are available for toasting various types of food articles, such as bread slices, bagels, and the like. However, efforts are continuously being made to improve the toasting operation or the toast produced thereby.

BRIEF SUMMARY OF THE INVENTION

According to one aspect of the present invention, there is provided an automatic toaster apparatus for toasting food articles comprising: a food article holder for holding a plurality of the food articles to be toasted; a toaster unit; and a feeding device for successively feeding the food articles from the food article holder into the toaster unit for toasting, and out of the toaster unit after toasting; the toaster unit including a pair of electrical heater plates located to straddle the food article when in the toaster unit; the toaster unit further including displacing means for displacing at least one of the heater plates towards a food article in the toaster unit for accelerating the toasting thereof, and away from the food article for facilitating the feeding of such food article into the toaster unit before toasting and out of the toaster unit after toasting.

The preferred embodiments of the invention described below, the displacing means displaces both heater plates towards each other to accelerate the toasting of a food article between them, and away from each other to facilitate the feeding of each food article into and out of the toaster unit. In the described preferred embodiments, the displacing means includes a scissors-like link assembly mounted to and between the two heater plates at each side of the heater plates.

In one described preferred embodiment, the food article holder is configured and dimensioned to hold a stack of bread slices to be toasted; and in a second described preferred embodiment, the food article holder is configured and dimensioned to hold a stack of bagels, or similar type rolls having a relatively hard crust layer on its outer surface.

According to another aspect of the present invention, there is provided toaster apparatus for toasting a roll having a relatively hard crust layer on its outer surface comprising: a cutter unit; a toaster unit; and a feeding device for feeding a roll to be toasted along a feed path through the cutter unit and then along a feed path through the toaster unit; the cutter unit including a cutter blade extending transversely across the feed path of the roll through the cutter unit to cut the roll as it is fed through the cutter unit; the toaster unit including electrical heater means for toasting the cut faces of the roll.

In one described preferred embodiment, the cutter unit includes a pair of cutter blades extending transversely across, and on opposite sides of, the feed path of the roll through the cutter unit to cut away the crust layer on the opposite faces of the roll.

The described preferred embodiment is particularly useful for toasting bagels. The toaster unit includes a pair of electrical heater plates, and also includes displacing means for displacing at least one of the heater plates, preferably both heater plates, towards the bagel or other roll in the toaster unit for accelerating the toasting thereof, and away from the bagel for facilitating the feeding of the bagel into the toaster unit before toasting, and out of the toaster unit after toasting.

Further features and advantages of the invention will be apparent from the description below.

BRIEF DESCRIPTION OF THE DRAWINGS

The invention is herein described, by way of example only, with reference to the accompanying drawings, wherein.

Figure 1:
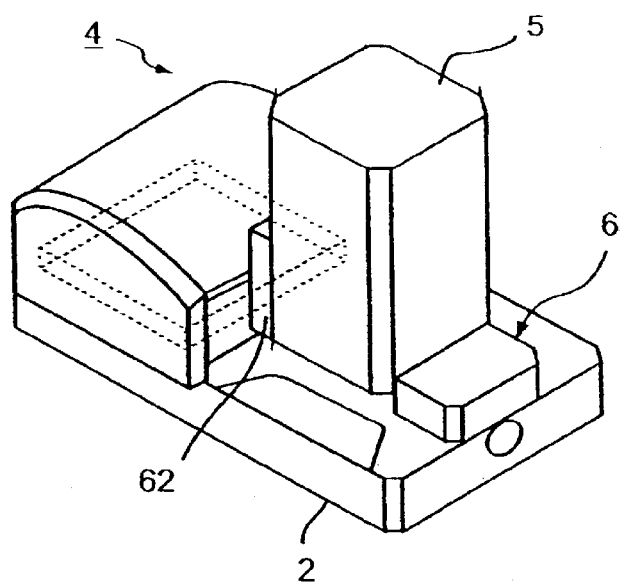
FIGS. 1–6 illustrate one form of automatic toaster apparatus constructed in accordance with the present invention for toasting bread slices, FIG. 1 being a three-dimensional view of the toaster apparatus, FIG. 2 being a top plan view, FIG. 3 being a side elevational view, FIG. 4 being an end view, FIG. 5 being a side elevational exploded view and FIG. 6 being a three-dimensional exploded view.
Figure 2:
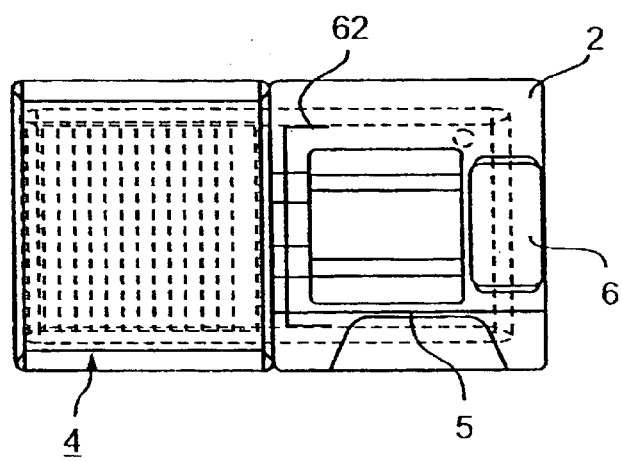
Figure 3:
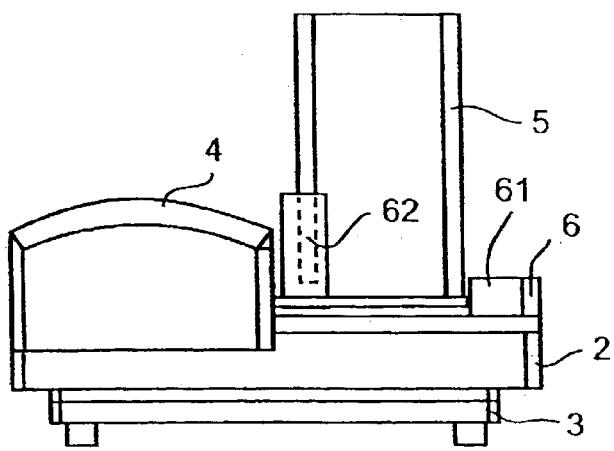

It is to be understood that the foregoing drawings, and the description below, are provided primarily for purposes of facilitating understanding the conceptual aspects of the invention and various possible embodiments thereof, including what is presently considered to be preferred embodiments. In the interests of clarity and brevity, no attempt is made to provide more details than necessary to enable one skilled in the art, using routine skill and design, to understand and practice the described invention. It is to be further understood that the embodiments described are for purposes of example only, and that the invention is capable of being embodied in other forms and applications than described herein.

THE AUTOMATIC TOASTER APPARATUS OF FIGS. 1–6

FIGS. 1–6 illustrate an automatic toaster apparatus particularly useful for toasting bread slices. The apparatus includes a housing 2, supported on a base 3 and including a toaster unit, generally designated 4, occupying one end of the housing. The opposite end of housing 2 supports a food article holder 5, in the form of a magazine configured and dimensioned to hold a vertical stack of bread slices in front of the toaster unit 4. A feeding device, enclosed within housing section 6, successively feeds the food slices from holder 5 into the toaster unit 4 for toasting, and out of the toaster unit after toasting.

Figure 5:
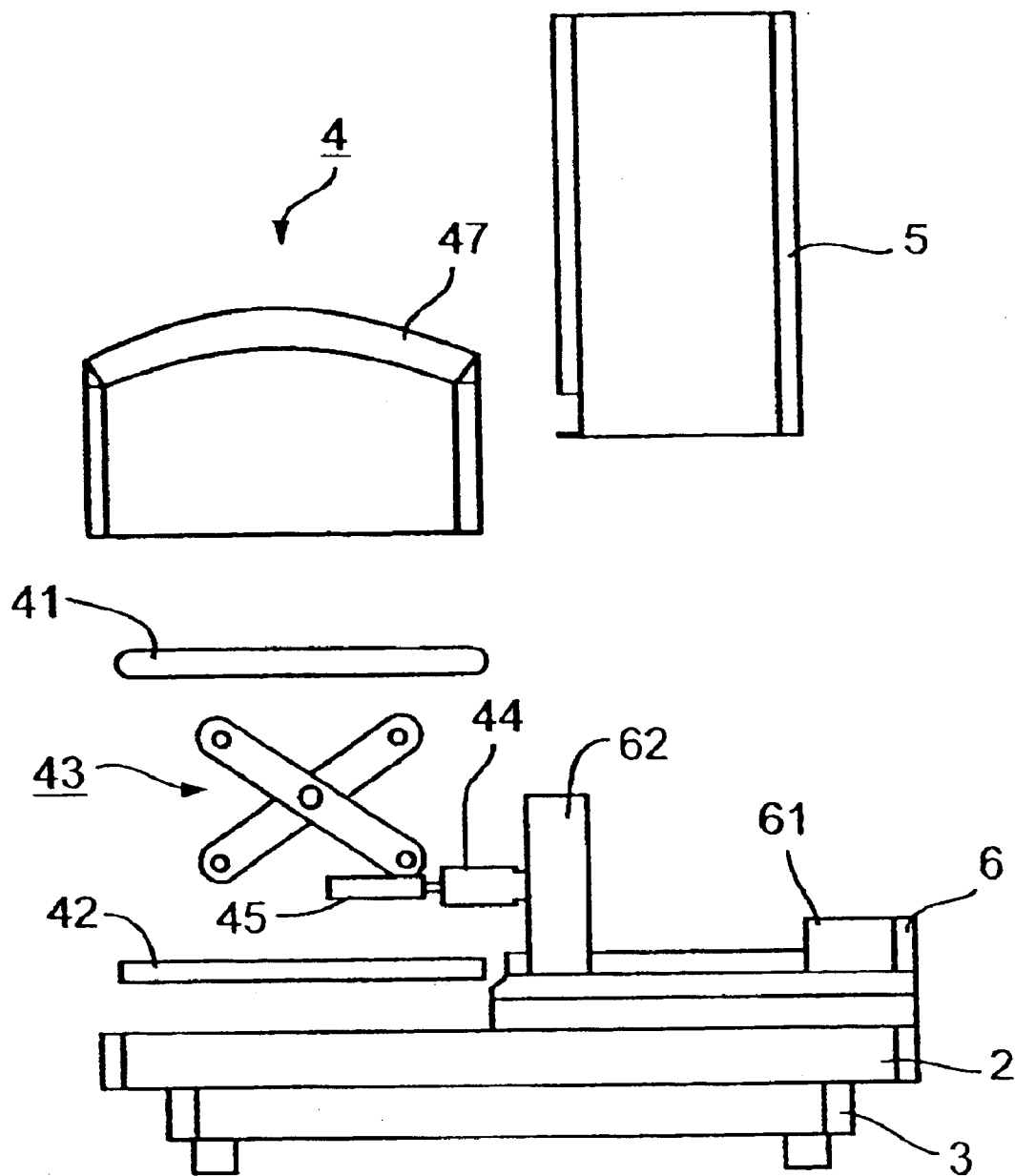
Figure 6:
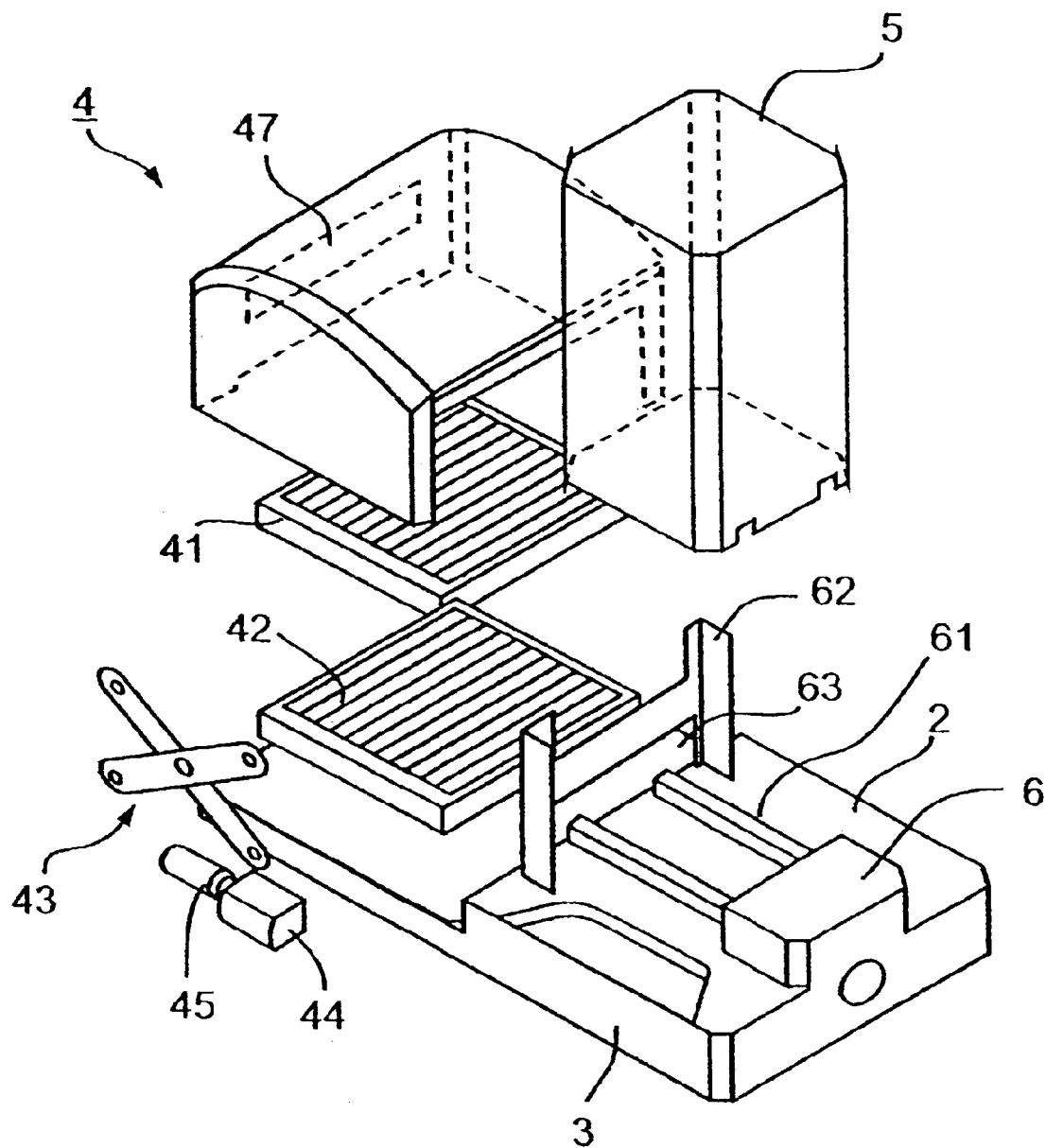
Figure 7:
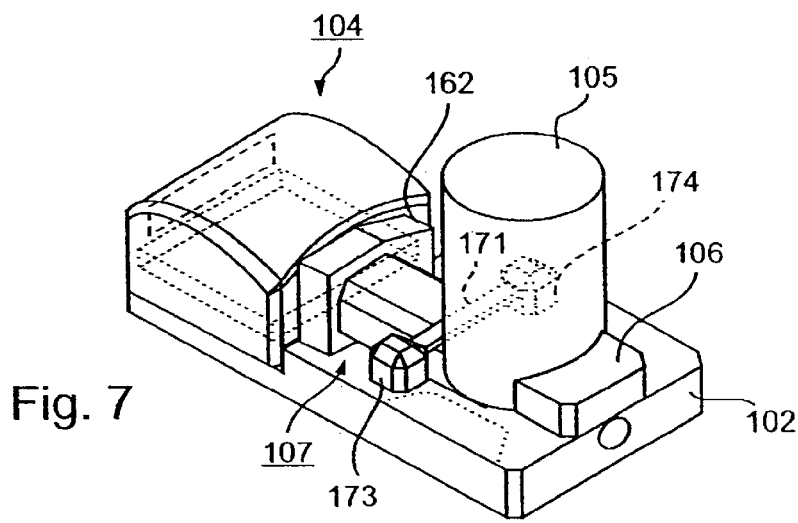
FIGS. 7–11 illustrate another automatic toaster apparatus constructed in accordance with the present invention particularly useful for toasting bagels or similar type of rolls having a relatively hard crust layer on its outer surface, FIG. 7 being a three-dimensional view of the toaster apparatus, FIG. 8 being a top plan view, FIG. 9 being a side elevational view, FIG. 10 being an end view, and FIG. 11 being an exploded view.
Figure 8:
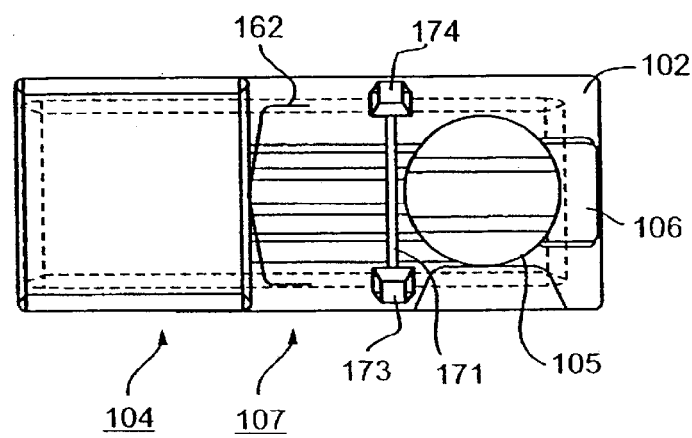
Figures 9, 10:
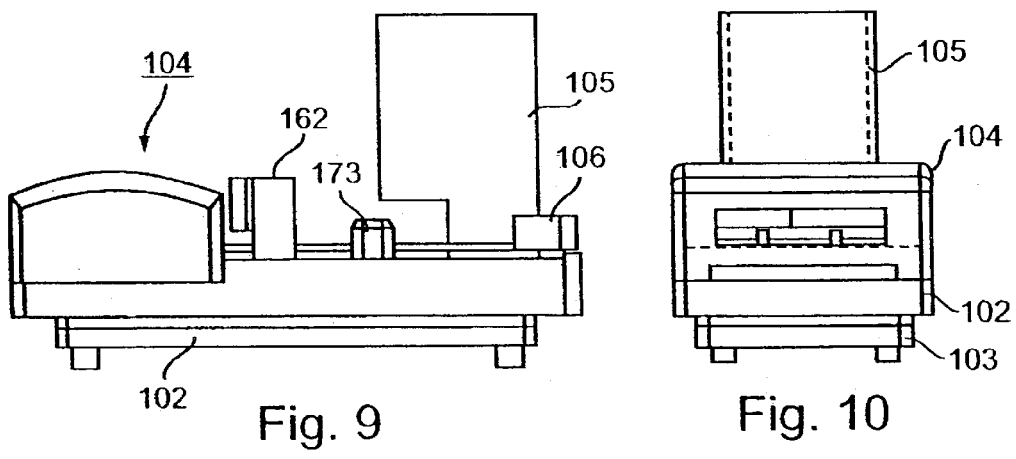
Figure 11:
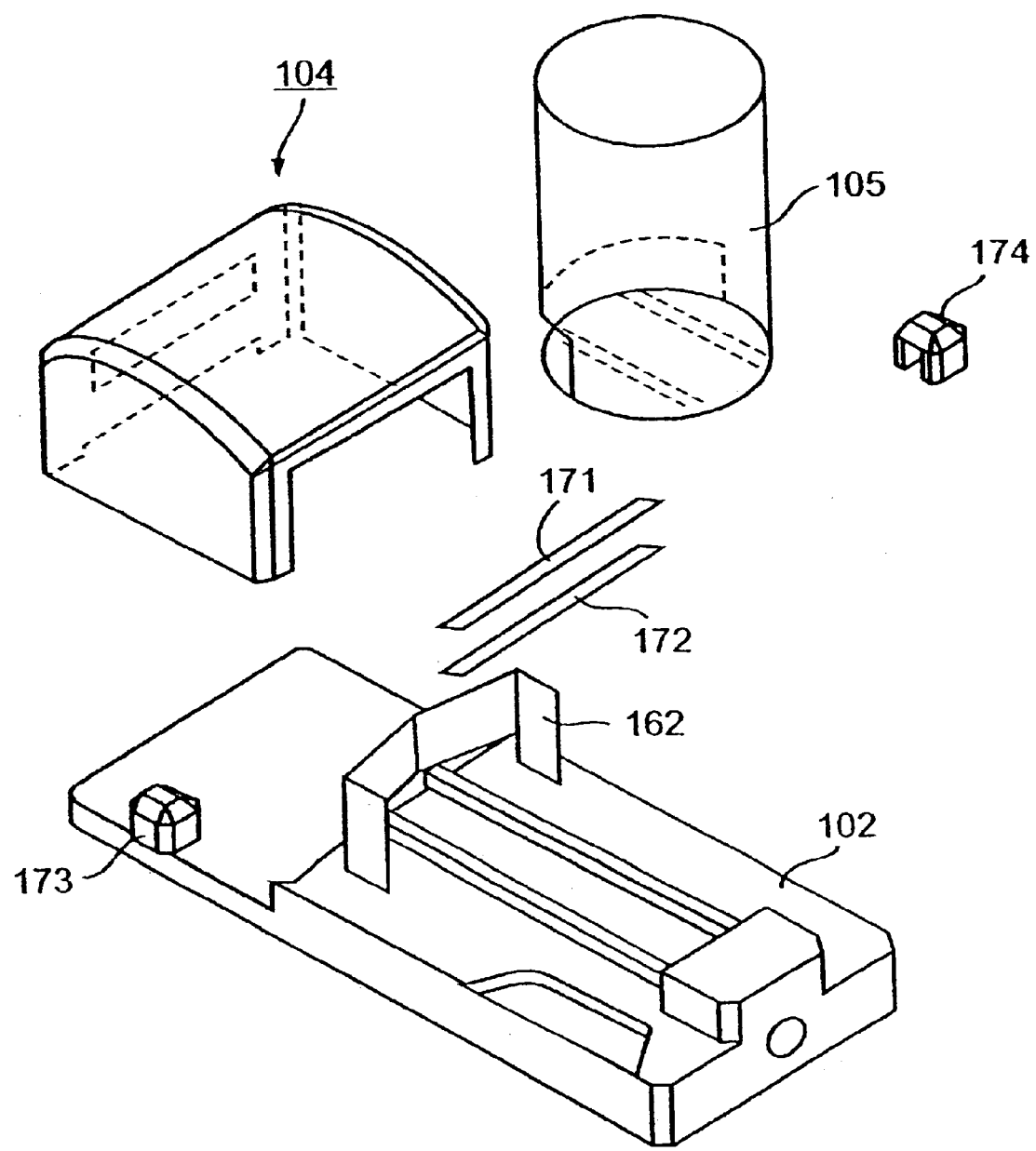

The structure of the illustrated apparatus, particularly of the toaster unit 4, is better seen in the explosive views of the FIGS. 5 and 6. As shown in these figures, the toaster unit 4 includes a pair of electrical heater plates 41, 42 located to straddle the bread slice when in the toaster unit. The toaster unit further includes displacing means, in the form of a pair of scissors-like link assemblies 43 (only one of which is shown in FIGS. 5 and 6) mounted to and between the two heater plates at each side of the heater plates. The link assemblies 43 are driven by electrical motor 44, via a screw 45, such that when the motor is rotated in one direction, the two heater plates 41, 42 are moved away from each other and from the bread slice in between, and when the motor is rotated in the opposite direction, the two heater plates are moved toward each other and the bread slice in between.

Figure 4:
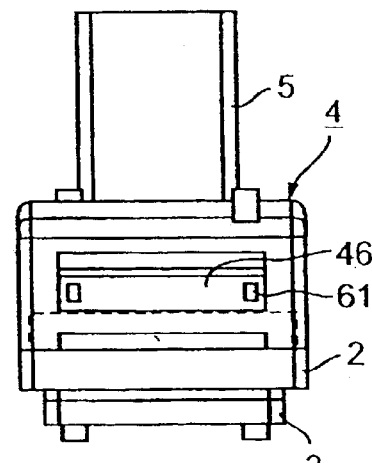

After a bread slice has thus been toasted, it is fed out of the toaster unit via an exit opening 46 (FIG. 4).

Toaster unit 4 further includes a removable cover 47 overlying the heater plates 41, 42 and the displacing link assemblies 43.

The bread slice magazine 5 is also removable from housing 2. It is preferably of a transparent plastic construction to permit the viewing the bread slices stack within it.

The displacing means within housing section 6 includes a reciprocatable member 61 aligned with the bread slice within the magazine 5 at the bottom of the stack. Member 61 is driven in any usual manner e.g. by another motor (not shown) within housing 2, so as to feed the bottom slice in the stack into the toaster unit 4 between the heater plates 41, 42 when the heater plates are in their spaced-apart position. Motor 44 is then energized to actuate the link assemblies 43 such as to move the two heater plates 41, 42 towards each other into engagement with, or in close proximity to, the exposed surfaces of the bread slice within the heater unit, in order to accelerate the toasting of the bread slice.

The feeding of a bread slice from magazine 5 into the toaster unit 4 is effected through a restrainer member 62 having a slot 63 in alignment with the toaster inlet, to allow only a single slice to be fed into the toaster unit.

After a bread slice has been suitably toasted, e.g. as determined by a color selector (not shown) which may be of standard construction, motor 44 is again energized to move the two heater 41, 42 apart; and feeder member 61 is again actuated to feed the toasted bread slice out of the exit opening 46 (FIG. 4) of the toaster unit.

THE AUTOMATIC TOASTER APPARATUS OF FIGS. 7–11

FIGS. 7–11 illustrate an automatic toaster apparatus particularly useful for toasting bagels, or other roll having a relatively hard crust layer on its outer surfaces.

The illustrated apparatus also includes a housing, generally designated 102, mounted on a base 103. One end of housing 102 supports a toaster unit 104, and the opposite end supports a food article holder 105 which, in this case, is a magazine dimensioned and configured to hold a plurality of bagels, or other type of roll, in a vertical stack. Housing 102 further includes a section 106 housing a feeding device for feeding a roll to be toasted from the bottom of the stack within magazine 105.

As distinguished from the apparatus of FIGS. 1–6, the apparatus illustrated in 7–11 further includes a cutter unit, generally designated 107, between the bagel magazine 105 and the toaster unit 104. As shown particularly in FIG. 11, cutter unit 107 includes a pair of cutter blades 171, 172, extending transversely across, and on opposite sides of, the feed path of the bagel through the cutter unit. The two cutter blades 171, 172 are mounted at their opposite ends by mountings 173 and 174 respectively, and are reciprocated by an electrical motor (not shown) within the housing 102 so as to cut away the crust layers on the opposite sides of the bagel (or other roll) when fed through the cutter unit 107 via restrainer member 162 to the toaster unit 104.

Toaster unit 104 may be of the same construction as described above with respect to toaster unit 4 illustrated in FIGS. 1–6 to include displaceable heater plates movable towards and away from each other. On the other hand, toaster unit 104 could be of a construction which does not include displaceable heater plates. In either case, the heater plates are effective to toast the freshly-cut surfaces of the bagel after the crust layers have been cut away from the opposite faces of the bagel.

While the toaster apparatus illustrated in FIG. 7–11 includes two cutter blades, it is contemplated that the cutter unit could include a single cutter blade cutting the bagel, or other roll, through its centre, to thereby produce two half-bagels each having a freshly-cut face. In such case, the electrical heater means could be in the form a single electrical heater plate, or a pair of electrical heater plates, for toasting the two freshly-cut surfaces of the two half-bagels.

While the invention has been described with respect to two preferred embodiments, it will be appreciated that these have been set forth merely for purposes of examples, and that many other variations, modifications and applications of the invention may be made.

What is claimed:

1. Automatic toaster apparatus for toasting food articles, comprising:

a food article holder for holding a plurality of the food articles to be toasted;

a toaster unit;

and a feeding device for successively feeding the food articles from said food article holder into said toaster unit for toasting, and out of the toaster unit after toasting;

said toaster unit including a pair of electrical heater plates located to straddle the food article when in said toaster unit;

said toaster unit further including displacing means for displacing at least one of said heater plates towards a food article in the toaster unit for accelerating the toasting thereof, and away from the food article for facilitating the feeding of such food article into the toaster unit before toasting and out of the toaster unit after toasting.

2. The apparatus according to claim 1, wherein said displacing means displaces both of said heater plates towards each other to accelerate the toasting of a food article between them, and away from each other to facilitate the feeding of each food article into and out of the toaster unit.

3. The apparatus according to claim 2, wherein said displacing means includes a scissors-like link assembly mounted to and between the two heater plates at each side of the heater plates.

4. The apparatus according to claim 1, wherein said food article holder holds the food article in the form of a vertical stack in front of the toaster unit.

5. The apparatus according to claim 4, wherein said feeding device includes a feeding member reciprocatably mounted in alignment with the bottom of said vertical stack for feeding the food articles successively from the bottom of the stack into said toaster unit.

6. The apparatus according to claim 5, wherein said food article holder is configured and dimensioned to hold a stack of bread slices to be toasted.

7. The apparatus according to claim 5, wherein said food article holder is configured and dimensioned to hold a stack of rolls to be toasted.

8. The apparatus according to claim 7, wherein the rolls to be toasted have a relatively hard crust layer on their outer surfaces; and wherein said apparatus further includes, between said article holder and said toaster unit, a cutter unit having at least one cutter blade for cutting through the roll before the roll is fed into the toaster unit.

9. The apparatus according to claim 8, wherein said cutter unit includes a pair of spaced cutter blades for cutting away the crust layer on the opposite faces of the roll before the roll is fed into the toaster unit.

10. The apparatus according to claim 8, wherein said food article holder is configured and dimensioned to hold a vertical stack of bagels.

11. Toaster apparatus for toasting a roll having a relatively hard crust layer on its outer surface comprising:

a cutter unit;

a toaster unit;

and a feeding device for feeding a roll to be toasted along a feed path through said cutter unit and then along a feed path through said toaster unit;

said cutter unit including a cutter blade extending transversely across the feed path of the roll through said cutter unit to cut the roll as it is fed through the cutter unit;

said toaster unit including electrical heater means for toasting the cut faces of the roll.

12. The apparatus according to claim 11, wherein said cutter unit includes a pair of cutter blades extending transversely across, and on opposite sides of, the feed path of the roll through said cutter unit to cut away the crust layer on the opposite faces of the roll.

13. The apparatus according to claim 12, wherein said toaster unit includes a pair of electrical heater plates, and displacing means for displacing at least one of said heater plates toward a roll in the toaster unit for accelerating the toasting thereof, and away from the roll for facilitating the feeding of the roll into the toaster unit before toasting, and out of the toaster unit after toasting.

14. The apparatus according to claim 13, wherein said displacing means displaces both said heater plates towards each other to accelerate the toasting of a roll between them, and away from each other to facilitate the feeding of the roll into and out of the toaster unit.

15. The apparatus according to claim 14, wherein said displacing means includes a scissors-like link assembly mounted to and between the two heater plates at each side of the heater plates.

16. The apparatus according claim 11, wherein the apparatus further includes a roll holder for holding a plurality of rolls to be toasted in the form of a vertical stack in front of the toaster unit.

17. The apparatus according to claim 16, wherein said feeding device includes a feeding member reciprocatably mounted in alignment with the bottom of said vertical stack of rolls for feeding the rolls successively from the bottom of the stack into said toaster unit.

18. The apparatus according to claim 17, wherein said roll holder is configured and dimensioned to hold a plurality of bagels in the form of a vertical stack.

* * * * *